ELECTRICAL CONTACTOR
Original Filed June 23, 1964 6 Sheets-Sheet 1
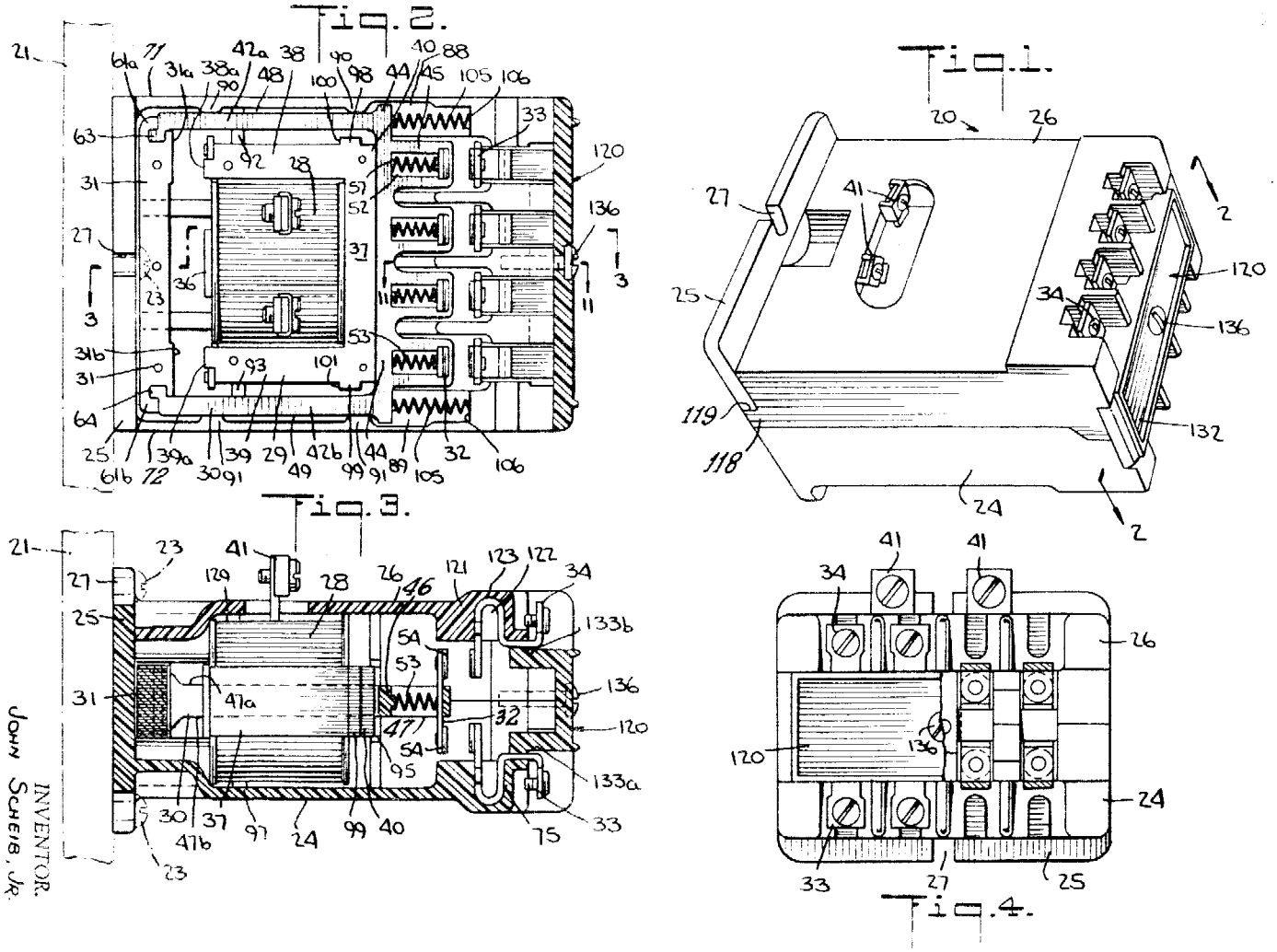
INVENTOR.
JOHN SCHEIB, JR.
BY
Frank A. Bower
ATTORNEY

ELECTRICAL CONTACTOR

Original Filed June 23, 1964 6 Sheets-Sheet 2

INVENTOR
JOHN SCHEIB, JR

BY
Frank A. Bonner
ATTORNEY

ELECTRICAL CONTACTOR
Original Filed June 23, 1964 6 Sheets-Sheet 3
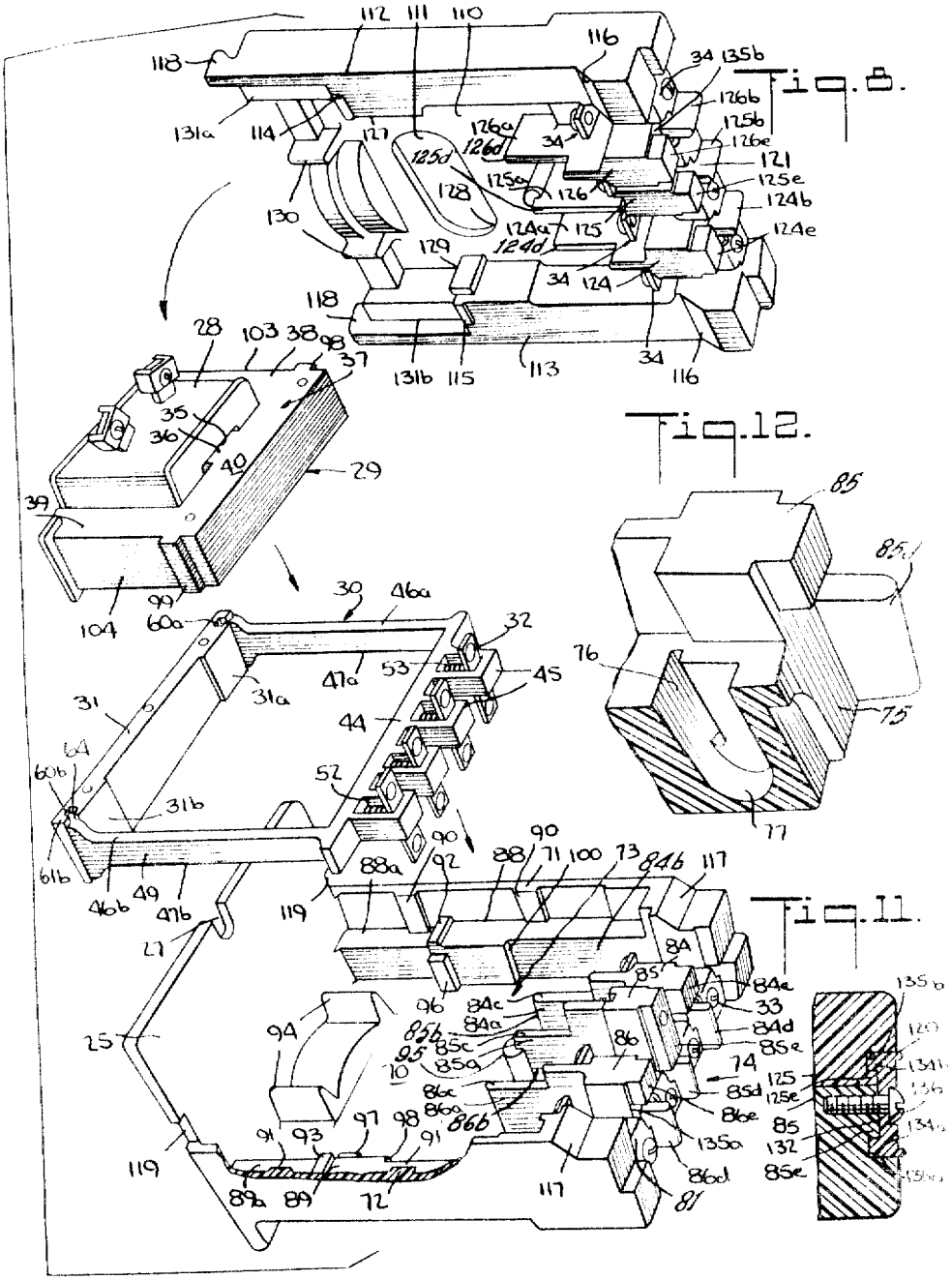
INVENTOR
JOHN SCHEIB, JR.
BY
Frank C. Bruce
ATTORNEY

ELECTRICAL CONTACTOR

Original Filed June 23, 1964 6 Sheets-Sheet 4

INVENTOR.
JOHN SCHEIB, JR.

BY Frank C. Bauer
ATTORNEY

ELECTRICAL CONTACTOR

Original Filed June 23, 1964 6 Sheets-Sheet 5

INVENTOR.
JOHN SCHEIB, JR.

BY
Frank G. Brier
ATTORNEY

ELECTRICAL CONTACTOR

Original Filed June 23, 1964 6 Sheets-Sheet 6

INVENTOR.
JOHN SCHEIB, JR.
BY
Frank C. Phillips
ATTORNEY

United States Patent Office

Re. 26,172
Reissued Mar. 7, 1967

26,172
ELECTRICAL CONTACTOR

John Scheib, Jr., Elmsford, N.Y., assignor to Ward Leonard Electric Co., Mount Vernon, N.Y., a corporation of New York Original No. 3,194,920, dated July 13, 1965, Ser. No. 377,333, June 23, 1964. Application for reissue Oct. 5, 1966, Ser. No. 589,171
21 Claims. (Cl. 335—131)

Matter enclosed in heavy brackets [ ] appears in the original patent but forms no part of this reissue specification; matter printed in italics indicates the additions made by reissue.

This is a continuation-in-part of my copending application Serial No. 130,090 filed August 8, 1961, and entitled "Electrical Contactor" which is now abandoned.

This invention relates to electrical contactors and is directed particularly to the dynamic components of the contactor and the casing supporting and housing the electrical units of the contactor.

An object of the invention is to provide an electrical contactor with a minimum number of parts that are easily assembled into a properly operating contactor.

Another object of the invention is to provide an electrical contactor formed of separable parts that are assembled into an operable contactor with a minimum of threaded or similar fasteners to retain the parts in position.

Another object of the invention is to provide an electrical contactor in which the operable parts may be inspected while in place and while the contactor is mounted on a panel.

Another object of the invention is to provide parts of an electrical contactor that is inexpensive to manufacture and easily assembled with a minimum of manipulative movements.

Other and further objects of the invention will be apparent from the following description taken in connection with the drawings, in which—

FIG. 1 is an assembled perspective view of the electrical contactor;

FIG. 2 is a top view of the attaching supporting member with the closing supporting member removed to illustrate the electrical and magnetic components, and a sectional view of the fastening member taken along lines 2—2 of FIG. 1;

FIG. 3 is a sectional view of the contactor taken along lines 3—3 of FIG. 2;

FIG. 4 is an end view of the assembled contactor with the fastening member fragmentized to illustrate the fixed contacts;

FIG. 6 illustrates the attaching supporting member with the armature and contact carrier in place and the electromagnetic coil and core removed;

FIG. 11 is a fragmentary sectional view of the supporting members and the fastening members taken along lines 11—11 of FIG. 2;

FIG. 12 is a fragmentary sectional view of the fixed contact mounting means;

FIG. 23 is a plan view of the upper supporting member;

Figure 5:
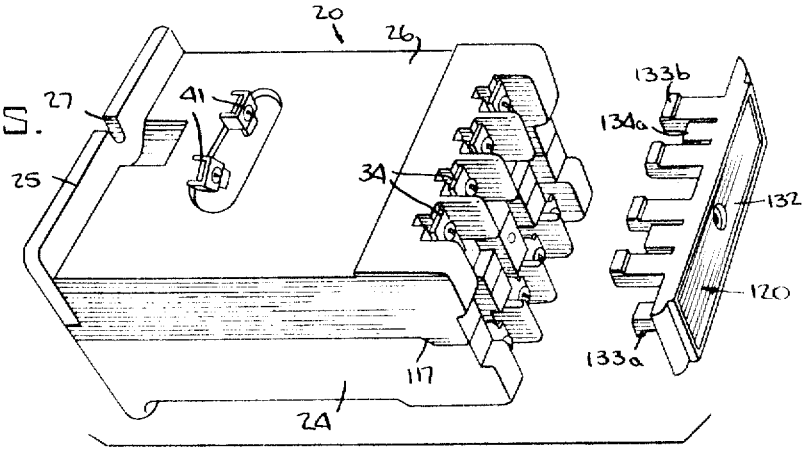
FIG. 5 illustrates the assembled contactor with the fastening member spaced for insertion into place.

Referring to the drawings, the electrical contactor 20 is mounted in a horizontal position on a vertical panel 21 by screws or bolts with the dynamic elements of the contactor reciprocating horizontally. In the described embodiment the supporting members 24 and 26 extend horizontally to form the member 24 as a lower member and the member 26 as an upper cover member. The member 24 has a vertical mounting base 25 molded as a single piece with the lower member. The base extends below the lower member 24 and above the upper member 26 to provide for the notches 27 through which the screws 23 extend.

The lower member supports the electromagnetic coil 28, core 29, carrier 30 with armature 31 and movable contacts 32. The fixed contacts 33, 34 are mounted in the lower and upper members respectively. The upper member sets on top of the lower member and is held in place by the hooks 118 fitting in the notches 119 and the fastening means 120.

The electromagnetic coil 28 may be of a conventional type with the winding encapsulated in epoxy resin to provide accurate dimensions. A hole 35 is provided through the coil for receiving the center leg 36 of the E-shaped core 37. The outer legs 38, 39 form the outer magnetic path in cooperation with the armature 31 and the cross leg 40. Terminals 41 are provided in the coil to supply electric current to the coil for energizing the contactor. The outer legs 38, 39 have end surfaces 38a, 39a engaged by the ground surfaces 31*a*, 31*b* of the armature. The core is of conventional laminated ferromagnetic steel and the surfaces of the core are flat for snugly fitting in position.

Figure 7:
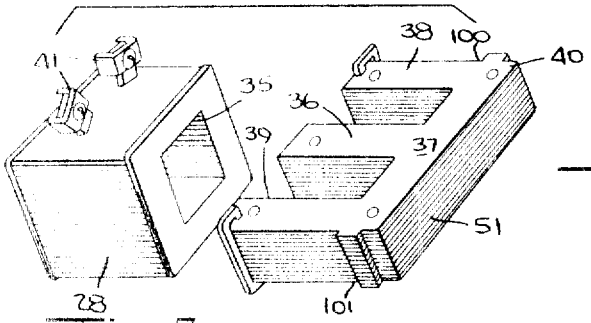
FIG. 7 illustrates an exploded view of the core and electromagnetic coil.
Figure 9:
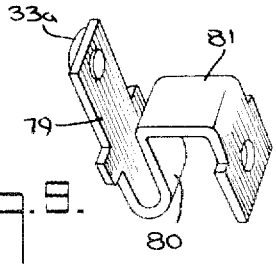
FIG. 9 is a perspective view of the fixed contact.
Figure 8:
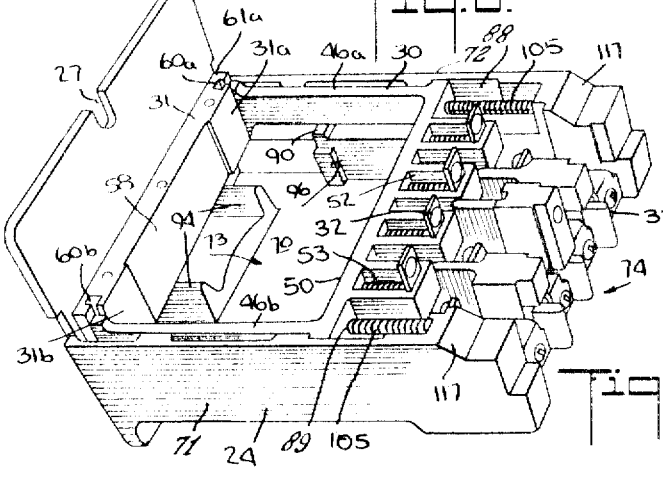
FIG. 8 is a perspective and exploded view of the components and members.
Figure 10:
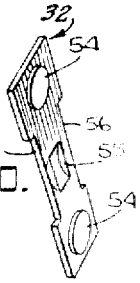
FIG. 10 is a perspective view of the movable contact.
Figure 13:
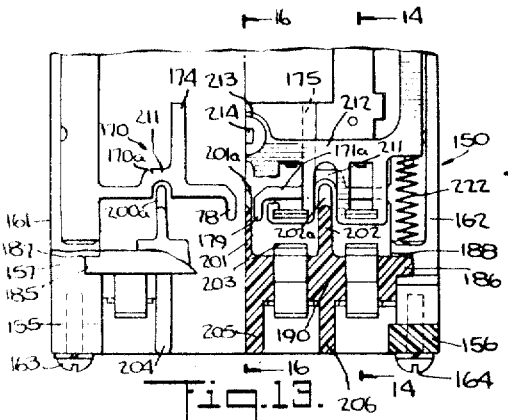
FIG. 13 is a fragmentary view of another embodiment illustrating the lower supporting member with a fragmentary half of the fixed contact illustrated in section and the other half of the lower supporting member illustrated without the fixed contact support, contact carrier and the electromagnet unit.

The movable contact carrier is preferably made of nylon and has a generally U shape formed by the guide members 42a, 42b and a cross member 44 with projections 45 for holding the movable contacts 32. The carrier is of a rectangular configuration with the upper and lower surfaces being planar to form flat guide surfaces 46a, 47a and 46b, 47b on the guide members 42a, 42b (FIG. 8). The side surfaces 48, 49 of the guide members are also flat for reciprocally engaging the side walls 71, 72 (FIG. 2). The inner surface 50 on the cross member 44 is flat and seats on the end surface 51 of the core on deenergization of the contactor (FIG. 7). The projections 45 have rectangular slots 52 extending in the direction of movement of the carrier. The walls of the slots are vertical to vertically support and guide the movable contact 32. Helical springs 53 forming a resilient means are positioned in the slots 52 to press the movable contacts 32 into engagement with the fixed contacts 33, 34.

The movable contacts are formed of thin flat metallic pieces having contact buttons 54 on each end and a loop 55 in the middle. The ends of the helical springs fit in the loop to hold the springs and contacts together and in place. In the side edges of the contacts are notches 56 for engaging the upper and lower surfaces 46, 47 and positioning the buttons in relation to the fixed contacts. In the slots on the cross member 44 are bosses 57 for seating and positioning the springs. At the other end of the carrier the armature 31 extends between the ends of the guide members 42a, 42b.

The armature is made of laminated ferromagnetic steel and is of a general elongated rectangular shape with a width substantially greater than its thickness. The armature has two ground surfaces 31a, 31b raised from the side 58 to space the side from the center leg 36 of the ferromagnetic core. The ends of the armature have grooves 60a, 60b extending the full width of the armature (FIG. 6). The grooves have overlapping lips 61a, 61b extending over the groove to partly close it. The guide members 42a, 42b have keys 63, 64 extending from the end to fit in the grooves and under the respective lips. The contact carrier is narrower than the armature so that the armature extends above and below the carrier.

The lower member 24 has a bottom panel 70 and side walls 71, 72 extending perpendicular to the panel and forming with the base 25 a chamber 73 for receiving the actuating and actuated components (FIG. 8). At the front of the lower member are mounting means 74 for supporting the fixed contacts 33, 34. The mounting means comprises a block portion 75 extending across the front of the lower member. The block portion has a plurality of aligned holes 76 evenly spaced across the member. The holes 76 are each rectangular in shape and have a cylindrically shaped bottom 77 to receive the U-shaped portion 80 of the fixed contact 33. The contact button is mounted on the leg 79 extending upwardly above the block to position the contact button 33a in the path of the respective movable contact buttons 54. On the other leg of the U-shaped portion 80 the L-shaped terminal portion 81 extends towards the front for attachment of leads to the contactor.

Between the holes 76 are partitions 84, 85, 86 extending between the contact carrier projections to isolate the movable contacts and the fixed contacts. The partitions have portions 84a, 85a, 86a reduced in thickness to provide space for projections 45. Steps 84b, 85b, 86b are provided to receive the crosspiece of the contact carrier and provide surfaces 84c, 85c, 86c on which the cross member 44 rests and reciprocates. On the front of the lower member the terminal portions 81 are isolated and recessed by the extensions 84d, 85d, 86d. On the outside the side walls 71, 72 extend to recess the end terminals.

The side walls have grooves or channels 88, 89 in which the legs 42a, 42b of the contact carrier move. On the vertical surfaces are bosses 90, 91 with flat vertical guide surfaces and on the horizontal surface are horizontal bosses 92, 93 at the same level or height as the surfaces 84c, 85c, 86c to evenly support the carrier. Since the armature 31 is wider than the carrier the channels have deeper portions 88a, 89a to space the walls from the armature. The armature 31 rests on the supports 94 extending upward from the bottom 70.

The core 37 is positioned in the lower member by setting on the posts 95, 96, 97 which are of the same height from the panel 70. The core has projections 98, 99 engaging steps 100, 101 to hold the core against the ends of the partitions 84a, 85a, 86a. The coil bears against the support 94 and the core crosspiece 40. The side surfaces 103, 104 bear against the walls 71, 72 to prevent sidewise movement. Thus the core and coil are held snugly in place. The posts 95, 96, 97 support the core above the bottom of the lower member to provide space for the coil 28.

The contact carrier is recessed in the lower member and the armature 31 extends above the side walls. The core 29 also extends above the walls a similar amount so that the contacting surfaces 31a, 31b and 38a, 39a are coextensive.

The armature is spaced from the core on deenergization by springs 105 located in the channels 88, 89 between the cross member 44 of the carrier and the end surfaces 106 facing the carrier.

The upper member 26 is complementary to the lower member and has a top panel 110 extending parallel to the bottom 70 of the lower member and has an opening 111 for the terminal 41 of the coil. Side walls 112, 113 extend from the top and are above the contact carrier. Opposite the bosses 92, 93 on the lower side walls are horizontal lateral bosses 114, 115 providing a narrow contact area for the upper surfaces 46a, 46b of the contact carrier. On the front end of the upper member sloped surfaces 116 match with the sloped surfaces 117 on the lower member. The side walls 71, 72 are higher than the side walls 112, 113 in order to recess the contact carrier and the walls 116, 117 reflect the difference in width. The hooks 118 on the rear end of the upper member and fitting in the notches 119 in the base are drawn against the base to firmly mount the upper member on the lower member with the walls 112, 113 engaging the walls 71, 72. The front part of the upper member is similar to the front part of the lower member. The fixed contact supporting block 121 extends across the front and has evenly spaced square sloped holes 122 with cylindrical bottoms 123. Partitions 124, 125, 126 are provided between the holes to isolate the fixed contacts 34 with respective movable contact 32. The partitions have portions 124a, 125a, 126a reduced in thickness to provide enlarged spaces between the partitions for the movable contacts. The fixed contacts 34 are identical to the fixed contacts 33 and fit into the holes 122 in a similar manner to the lower fixed contacts. The contact buttons 34a are mounted on the extended leg 79 of the U-shaped portion fitting in the hole 122 and the terminal 81 formed as part of the U-shaped portion attached to the other leg. The contact buttons 34a are positioned in the space between the partitions for engagement by a respective movable contact. The side walls extend forwardly to the terminals to recess the terminals in cooperation with the extensions 124b, 125b, 126b.

The portions 124a, 125a, 126a have surfaces 124c, 125c, 126c engaging the cross member 44 and forming a channel with the surfaces 84c, 85c, 86c in which the cross member 44 reciprocates. The bosses 114, 115 and surfaces 124c, 125c, 126c extend beyond the walls 112, 113 to provide narrow bearing surfaces for the contact carrier. Thus the contact carrier is slideably held between the bosses 92, 93 and bosses 114, 115 and between surfaces 124c, 125c, 126c. At the panel end the armature is guided by the supports 94 and 130.

Three posts 127, 128, 129 are provided to engage the upper surface of the core opposite to the lower posts 95, 96, 97 engaging the lower surface of the core for holding the core against vertical movement. Supports 130 opposite to the supports 94 on the lower member are provided to engage the upper surface of the armature 31 and hold it from vertical movement. The upper walls are recessed at 131a, 131b to provide space for the armature to reciprocate.

The upper and lower members 24, 26 are held together at the rear by the hooks 118 fitting in the notches 119 in the base 25 and at the front by the fastening means 120 slideably fitting in the front ends of the members 24, 26. The fastening means 120 is preferably made of nylon and has rectangular plate 132 with fingers 133a, 133b and stubs 134a, 134b extending normal to the plate along the upper and lower edges. The fingers 133a, 133b extend between the partitions and have a width approximately the same as the narrow space between the partitions to hold the fixed contacts 33, 34 in the holes as illustrated in FIG. 3. The fingers bear against the L-shaped terminal members 81 of the contacts to ensure the retention of the fixed contacts in the holes. The stubs fit in the recesses 135a, 135b formed by the extensions 84d, 86d and blocks 84e, 86e on the lower member, and the extensions 124b, 126b and blocks 124e, 126e of the upper member to lock the upper and lower members together. The center partition 85 of the lower member is higher than the other two portions 84, 86 and side walls 71, 72 to overlap the center of the plate 132 for receiving the bolt 136 securing the fastening means 120 to the lower member (FIG. 11). The center partition 125 of the upper member is correspondingly reduced in height. Thus the fastening means is seated in the front ends of the members by a single movement and retained in place by the bolt 136. Thus only one threading operation is required in the assembly and securing of the contactor.

As best illustrated in FIGS. 6, 7 and 8 the upper and lower members are formed in a single molding operation as well as the contact carrier. The armature, core and coil may be formed in the usual manner. The armature is fitted in the end of the carrier and the springs 53 and contacts 32 fitted in the slots 52. This assembly is positioned in the lower member. The assembled core and coil are set in place and the springs 105 fitted against the carrier. The fixed contacts 33 are previously inserted. Thus the lower member supports the carrier, the armature and the coil and core assembly. The upper member forms a closing or cover supporting member engaging the components and holding them in place by the fastening member 120 in cooperation with the hooks 118 and slots 119.

The side walls of the supporting members in cooperation with the front portions and bore provide the means supporting the contactor components. These supporting means extend inward and are within the transverse planes across the edges of the side walls. This arrangement provides for a compact housing. The housing when mounted horizontally has a narrow vertical dimension. This provides for close arrangement or stacking of the contactors. The coil and core assembly is held by the posts to position the assembly without causing hum or vibration. The contact carrier engages narrow surfaces and is loosely held between the supporting members by the bosses and projections and partitions.

The unit may also be mounted vertically or with the closing member on the bottom. The closing member, as described, has matching elements to support the coil and core assembly and the contact carrier and armature.

Figure 14:
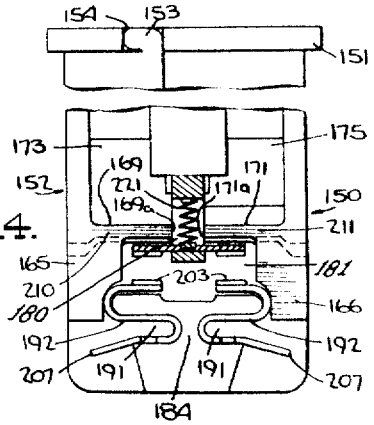
FIG. 14 is a fragmentary sectional view of an assembled contactor taken along lines 14—14 of FIG. 13.
Figure 15:
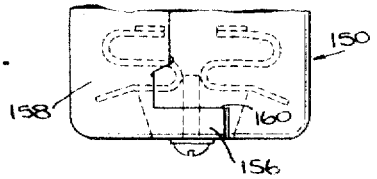
FIG. 15 is a fragmentary side view of the end of an assembled contactor.

In FIGS. 13, 14, 15 and 16 the front portion of another form of the contactor casing and fixed contact support is illustrated. The rear portions of the casing may be the same as illustrated in the previous embodiments. As illustrated in FIGS. 14 and 15, the lower supporting member 150 has a vertical base 151 for attaching the contactor to a vertical panel (not shown). The lower supporting member has a greater thickness than the upper supporting or cover member 152. The cover member 152 is attached to the member 150 by the hooks 153 fitting in notches 154 in the base 151. At the front end the cover member has projections 155, 156 extending from the side walls 157, 158 of the cover member 152 to transversely overlap with the side walls 161, 162 by fitting in the notches 159, 160. Bolts 163, 164 pass through the projections 155, 156 to thread into the side walls 161, 162 of the lower member.

Between the side walls 157, 158 of the cover member and the side walls 161, 162 of the lower member are top and bottom walls 165, 166 forming a chamber for receiving the electromagnet, the armature and movable contact carrier.

The contact carrier is supported in the side walls 157, 158 and side walls 161, 162 in a similar manner as in the previous embodiment or as modified in FIGS. 13 to 21. The top and bottom walls 165 and 166 have partitions 168, 169 and 170 and 171 respectively which extend normal to the walls to provide upper and lower guide surfaces 168a, 169a and 170a and 171a respectively for engagement by the contact carrier. With the lower member in the bottom position, the carrier rests on the guide surfaces 170a, 171a. The partitions have portions 172, 173, 174 and 175 extending rearward to hold the E-shaped core in position in a manner similar to the partitions 84a, 85a, 86a, 124a, 125a and 126a of the embodiment in FIGS. 1 to 12. The partitions are notched or stepped to hold the core member between the upper and lower members of the contactor and also to hold the core member against longitudinal movement. The partitions 168 to 171 have forwardly turned portions 176, 177, 178 and 179 forming upper and lower channels. With the cover member on the lower member the partitions 168 and 169 form a horizontal opening 180 with the partitions 170 and 171. The contact carrier extends through this opening to engage the fixed contacts positioned in a recess or space 181 bound by the top and bottom walls 165, 166 and the side walls 157 through 162. A fixed contact carrier plug or supporting member fits in between the side walls and bottom and top walls through the front open end.

The separable fixed contact supporting member plug 184 has flanges 185, 186 fitting in grooves 187 and 188 in the side walls of the cover and lower members. The fixed contact supporting plug 184 is positioned between the side walls as illustrated in FIG. 14 with the inner end of the block extending into the space 181 between the top and bottom walls to recess and enclose the fixed contacts and to hold the fixed contacts against dislodgment from the plug 184.

The fixed contact support has a laterally extending block 190 with spaced recesses 191 for receiving the U portions of the fixed contacts 192. The contacts have a generally S shape with a second button supporting portion having a U shape fitting over the sides of the block to support the contact buttons for engagement by the movable contacts. On the inner surface of the wall are partitions 200, 201 and 202 for spacing the fixed contact buttons 203 and partitions 204, 205 and 206 isolating fixed contact terminals 207. The partitions 204 to 206 extend to the outer surfaces of the cover and lower members and abut against the front end of the top and bottom walls 165 and 166.

The inner partitions 200, 201, 202 isolating the contact buttons extend from the top wall to the bottom wall and have notched portions 200a, 201a and 202a to accommodate the contact carrier 209 and to form engaging or guiding surfaces for the contact carrier. The partitions 168, 169, 170 and 171 on the top and bottom walls have curved portions 210, 211 forming a groove into which the stepped partitions 200 and 202 overlap the guide surfaces of the partitions. The center partition 201 extends between the inturned portions 176 to 179 which provide a longitudinal extension of the guide surfaces to overlap with the guide surfaces formed by the center partitions.

Figure 16:
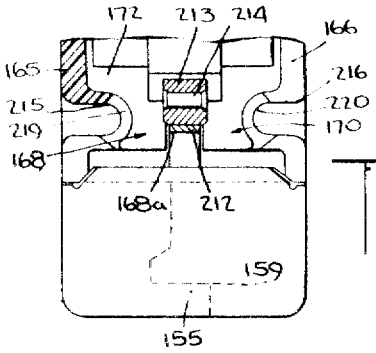
FIG. 16 is a fragmentary sectional view of an assembled contactor taken along lines 16—16 of FIG. 13.

On the cross leg 212 of the contact carrier is a boss 213 with a hole 214 for receiving a rod (not shown) to actuate other contacts or contact carriers exterior to the contactor described above. As illustrated in FIG. 16 the top and the bottom walls have indents 215, 216 with rounded bottoms and slots 219, 220. The rods extend through the slots.

Springs 221 are provided to urge the movable contacts against the fixed contact buttons and springs 222 are provided to urge the carrier away from the fixed contacts.

Figure 17:
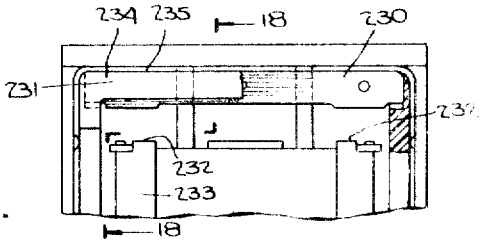
FIG. 17 is a fragmentary top view of another embodiment of the contact and armature carrier.
Figure 18:
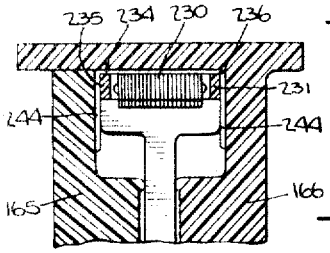
FIG. 18 is a fragmentary sectional view taken along lines 18—18 of FIG. 17.
Figure 19:
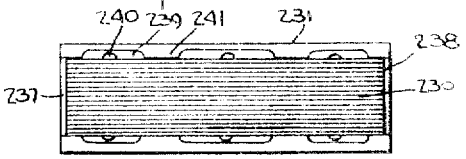
FIG. 19 is a rear view of the contact carrier.

In FIGS. 17, 18 and 19 a modification of the supporting relation of the armature and contact carrier or actuator is illustrated. The armature 230 is loosely fitted into the contact carrier 231 in order to accommodate to the seating surfaces 232 of the E-shaped core 233. Extending between the ends of the legs of the contact carrier or actuator are upper and lower web members 235, 236 forming an opening 234 closed at ends by the end webs 237, 238. The upper end lower webs have notches 239 to accommodate the heads of the rivets 240. The upper and lower webs are spaced apart substantially wider than the legs or guide members of the contact carrier and the side walls are notched to accommodate the ends as illustrated in FIG. 18. The armature detachably engages the lands 241 and the webs 237, 238. The armature is removable endwise from the carrier and recess. On de-energization the armature is held in the recess by the springs 222 pressing the carrier against the base 151 and on energization is drawn and held against the E-shaped core by the magnetic forces to close the contacts. The lateral wall 234 slidably engages and is guided by the raised supports 244 in the top and bottom walls in a similar manner to the embodiment of FIGS. 1 to 12.

Figure 20:
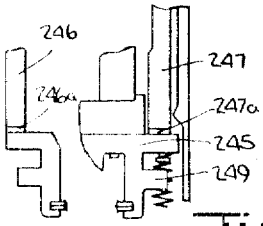
FIG. 20 is a fragmentary view of a contactor illustrating an embodiment of the carrier in two pieces.
Figure 21:
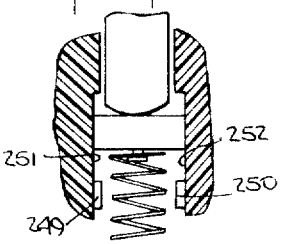
FIG. 21 is a fragmentary side view of the embodiment of the carrier with the upper and lower members illustrated in section.
Figure 29:
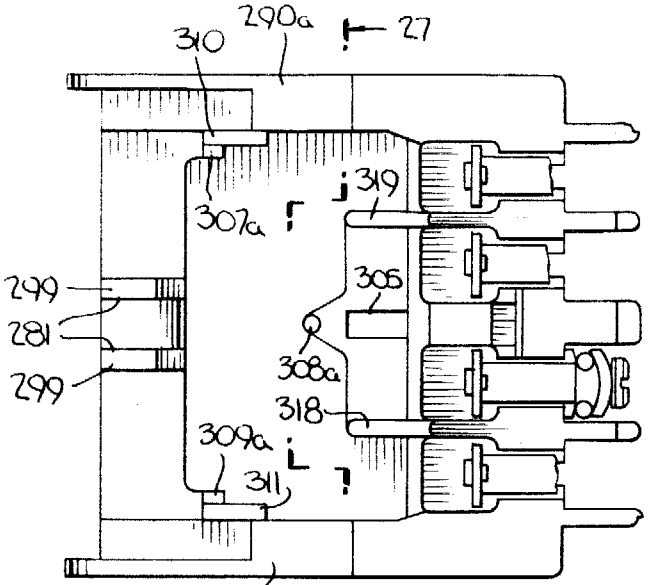

In FIGS. 20 and 21 another embodiment of the carrier or movable contact actuator is illustrated. The contact support 245 is a separate piece from the pushers 246, 247 which correspond to the legs of the carrier illustrated in the embodiment of FIGS. 1 to 12. The pushers are attached to the armature in the same manner as the legs or guide members 42a, 42b. The pushers have rounded ends 246a, 247a for engaging the movable contact support 245. The contact support is guided by the surfaces in the same manner as in the previous embodiment. Projections 249, 250 are provided on the upper and lower sides for engaging the guide surfaces 251, 252, respectively, on the side walls of the cover and lower members.

These projections prevent the contact support from tilting. The pushers are guided and supported by the side walls in the same manner as the guide members 42a, 42b of the carrier. The contacting engagement of the rounded ends permits the pushers to rock and accommodate the armature to the seating surfaces on the E-shaped core. Thus the contact support 245 has a linear movement to seat and disengage the movable contacts in a confined action while the pushers and armature may swing slightly to the pressures of the armature on seating. The pushers 246, 247 are loosely held by the side walls and the bosses, such as bosses 92, 93 of FIG. 8 which permit the pushers to shift in the casing.

The embodiment illustrated in FIGS. 22 to 28 is the preferred form of the invention and is substantially the same as the embodiment shown in FIGS. 1 to 8 except for the guiding of the contact carrier and for the holding of the upper and lower supporting members together by the fastening member. The upper and lower casing or supporting members 270 and 271 are substantially the same as in the other embodiment with the lower supporting member formed as a single piece with a mounting panel 272. The upper member 270 or cover is hingedly attached to the panel and secured to the lower member at the front by the fastening means or member 273. The front portions of the upper and lower members are substantially the same and the fixed contacts are of similar configuration and supported in a similar manner as in the previous embodiment.

The means for guiding the contact carrier 275 are different from the embodiment of FIGS. 1 to 8. Instead of the contact carrier being guided by the vertical bosses 90 and 91 in the side walls of the lower supporting member, projections 276 and 277 (FIGS. 22, 23, 27) in the armature supporting end 278 of the carrier fit in grooves 279, 280 formed by the walls 281 and 282 of the upper and lower member respectively and by the inwardly extending center partition 283 at the front of the lower member fitting between the movable contact supports 284. The side legs 285, 286 of the carrier 275 have rounded raised portions 287a, b and 288a, b on the upper and lower surfaces of the side legs which engage the flat surfaces 290a, b and 291a, b of the upper and lower members respectively for horizontally guiding the carrier. Thus the contact carrier is held from sidewise and transverse movement so as to move longitudinally to the upper and lower members for closing and opening the contacts on actuation and de-actuation of the electromagnet 274. At the armature end the lower member 271 has four surfaces 292 for slidably supporting the armature supporting end 278 of the carrier and the upper supporting member has two surfaces 299 for engagement by the supporting end 278. The surfaces 292 and 299 correspond to the supports 94 and 130 of the embodiment shown in FIG. 8. The armature supporting end 278 is similar to the embodiment shown in FIGS. 17, 18 and 19.

For interconnecting the carrier with the movable components of other adjacent unit slots 293 and 294 are provided in the side walls 295, 296 of the lower member and the carrier has connecting means 297, 298 with recesses fitting in the slots for accessibility from outside of the contactor. For actuation of other members above or below the contactor projections 300 and 301 on the cross member 302 of the carrier are provided with holes 303, 304. The upper and lower members 270, 271 have openings 305, 306 aligned with the movement of the projections for rendering the projections accessible from the exterior of the contactor for interconnecting with other units.

Figure 22:
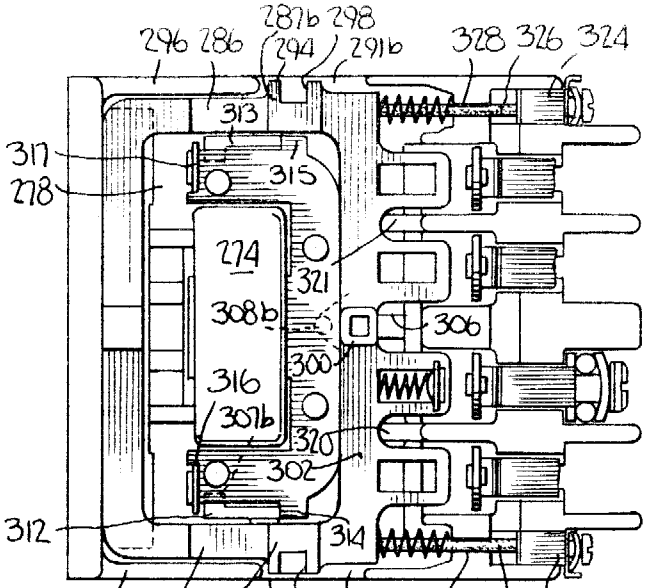
FIG. 22 is a plan view of the lower supporting member with the electromagnet, contact carrier and contacts.
Figure 27:
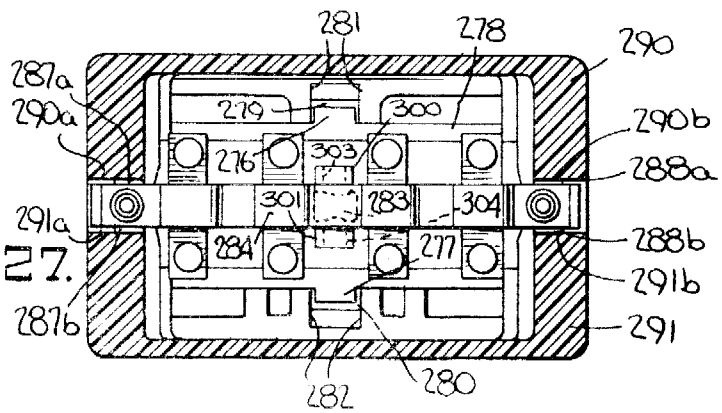
FIG. 27 is a sectional view of the upper and lower supporting members taken along lines 27—27 of FIG. 22 and a front view of the contact carrier mounted therein.
Figure 28:
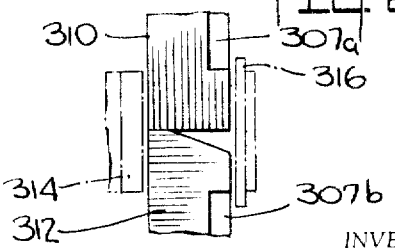
FIG. 28 is a fragmentary sectional view of one of the electromagnetic holding means.

The electromagnet 274 is held in a similar manner to the other embodiments on posts 307a, b, 308a, b and 309a, b of the upper and lower members respectively. However, in addition to the posts as illustrated in FIGS. 22, 23 and 28 members 310, 311 and 312, 313 are formed in the upper and lower members respectively to fit between the projections 314, 315 and the coil 316, 317 of the electromagnet. The members 310 to 313 and the extensions 318 to 321 of the partitions of the upper and lower members hold the magnet longitudinally.

Figure 25:
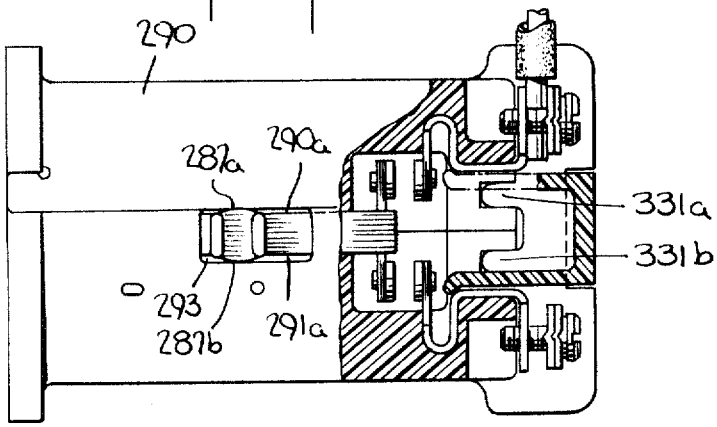
FIG. 25 is a side view of the upper and lower supporting members with the front portions partially fragmentized along lines 25—25 of FIG. 24.
Figure 24:
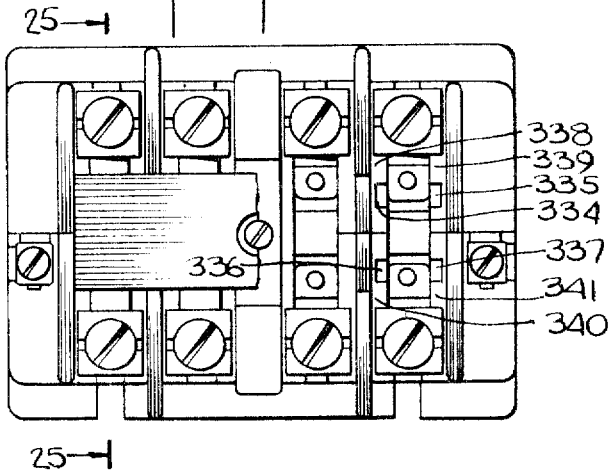
FIG. 24 is a front view of the upper and lower supporting members with the fastening member fragmentarily shown.
Figure 26:
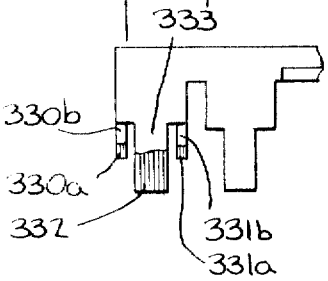
FIG. 26 is a fragmentary top view of the fastening member.

The coil of the electromagnet is connected to the terminals 323, 324 by the wires 325, 326 recessed in grooves 327, 328 and side walls of the lower member. The fastening means 273 is similar to the fastening means 120 illustrated in FIG. 5 except that the holding stubs 330a, b, 331a, b are on opposite sides of the fingers 332, 333. As illustrated in FIG. 24 mating notches 334 to 337 are provided in the partitions 338, 339 and 340, 341 on opposite sides of the terminals for receiving the stubs and holding the upper and lower members together. As illustrated in FIG. 25 the corresponding partitions on the other side are similarly constructed. Partitions 343 and 344 have notches 345 and 346 for stubs 331a, 331b. The fingers 332, 333 engage the fixed contacts in a similar manner to the embodiment of FIG. 5. The fastening means 273 is firmly interlocked with the upper and lower members to hold the members together and to firmly retain the fastening member from endwise dislodgment. However, a screw 342 is provided threading into the lower member to further retain the fastening member in place.

Various modifications and changes may be made in the embodiment without departing from the invention as set forth in the appended claims.

I claim:

1. An electrical contactor comprising a coil and core assembly including a movable armature actuated by said coil and core assembly, a generally planar shaped contact carrier having contacts normal thereto at one end and supporting means at the other end for holding said armature normal to said carrier, a mounting base with two matching holding members supportably attached thereto and extending normal thereto for enclosing said coil and core assembly, said matching holding members having a dimension lateral to said contact carrier substantially narrower than the dimension longitudinal to said carrier, each of said holding members having fixed contact holding means at the opposite end of said holding members from said mounting base and on opposite sides of the plane of movement of said carrier, each of said holding means having a set of fixed contacts supported thereby to form pairs of contacts for engagement by said carrier contacts on actuation, said holding members having means for [firmly] supporting said coil and core assembly and having guide surfaces extending longitudinally and parallel to the plane of movement of said contact carrier and at least one holding means having surfaces extending longitudinally to and normal to said plane of movement of said contact carrier for linearly guiding said contact carrier in a plane on actuation by said coil and core assembly.

2. An electrical contactor comprising contactor components including a coil and core assembly with a movable armature and a contact carrier having contacts normal thereto at one end and supporting means at the other end for holding said armature normal to said carrier, a mounting base, two matching contactor component holding means forming an enclosing casing attached to and supported by said base and extending therefrom with a longitudinal length normal to said base substantially greater than the thickness parallel to said base, said holding members having side walls and panels connecting said side walls of a respective member and fixed contact mounting means between said side walls at the end opposite to said base forming a chamber in said casing, said fixed contact mounting means having a set of fixed contacts for engagement by said carrier contacts on actuation, said holding members having opposite means for [firmly] supporting said core assembly therebetween, said sides having facing guide surfaces extending parallel to the plane of movement of said contact carrier and at least one of said holding members having second guide surfaces extending longitudinal and normal to the plane of movement of said contact carrier for linearly guiding said contact carrier in a plane on actuation by said armature of said coil and core assembly.

3. An electrical contactor as set forth in claim 2 wherein one of said holding members is permanently attached to said base to form a lower member and said other member is detachably mounted on said base and lower member to form an enclosing cover.

4. An electrical contactor as set forth in claim 2 wherein said facing guide surfaces are narrow and extend crosswise to the carrier for a reduced engaging area.

5. An electrical contactor as set forth in claim 2 wherein said facing guide surfaces are formed in said side walls and said contact carrier has raised portions engaging said surfaces.

6. An electrical contactor as set forth in claim 2 wherein said contact carrier has surfaces extending longitudinally and normal to the movement of said carrier and said holding members have surfaces extending parallel therewith for holding said contact carrier against sidewise movement.

7. An electrical contactor as set forth in claim 2 wherein said fixed contact mounting means in said holding members have partitions extending longitudinally and normal thereto to isolate said fixed contacts and some of said partitions have longitudinally extending slots opening away from said base and interlocking means are provided fitting in said slots to fasten said holding members together.

8. An electrical contactor comprising a coil and core assembly with a movable armature; a generally planar-shaped contact carrier having bridging contact holding portion and guide members with means for attaching said armature to said contact carrier; bridging contacts resiliently mounted in said bridging contact holding portion normal to said carrier; a mounting base; a supporting member and a cover member attached to said base with the cover member on top of said supporting member forming an enclosing casing extending therefrom with a longitudinal length normal to said base substantially greater than the thickness parallel to said base; said supporting member and said cover member each having spaced side walls, panels connecting said side walls and fixed contact mounting means between said side walls at the end opposite to said base forming a chamber in said casing; fixed contacts held by said fixed contact mounting means to form pairs of contacts for engagement by said bridging contacts on actuation; said supporting member and said cover member having means for [firmly] supporting said coil and core assembly in said chamber; said side walls having facing guide surfaces parallel to the plane of said contactor and respective guide members between facing surfaces for guiding the movement of said carrier in a plane; said panels and said fixed contact mounting means having parallel longitudinally extending walls normal to the plane of movement of said contact carrier and said contact carrier having at least one projection fitting between said walls normal to one of said panels and said bridging contact holding portion having means engaging said walls on said fixed contact mounting means to guide said carrier linearly in the plane of movement.

9. An electrical contactor comprising a coil and core assembly, fixed contacts, a reciprocable contact carrier having contacts mounted thereon for engaging said fixed contacts, a supporting member having a chamber for housing contactor components, a retaining member for holding contactor components in said supporting member and closing said chamber to enclose contactor components, said supporting and retaining members having supports for positioning said coil and core assembly and having on each side of said core narrow surfaces above and below said contact carrier and lateral to the movement thereof for slideably guiding said contact carrier on energization and deenergization of said coil and core assembly to move said movable contacts in and out of engagement with said fixed contacts.

10. An electrical contactor as set forth in claim 9 wherein said contact carrier has a U-shaped yoke piece with two guide members and a cross member, said guide members and said cross member having flat surfaces for engaging said narrow surfaces on said members to provide for smooth reciprocal movement and an armature between the ends of the guide members for actuating the carrier on energization and deenergization of the coil and core assembly.

11. An electrical contactor as set forth in claim 10 wherein said guide members have offset projections and said armature has grooves with lips overlapping transversely with said projections fitting snugly in said grooves and bearing transversely against said lips to maintain the transverse dimensions of said carrier.

12. An electrical contactor as set forth in claim 9 wherein said moveable contact carrier comprises a moveable support for the moveable contacts, an armature and armature guide and support securely fastened to said armature, said armature guide and support being adjustably held by said upper and lower members and in actuating relation with said moveable support to force said moveable contacts into engagement on energization and to permit said armature to evenly seat on said core and coil assembly.

13. An electrical contactor as set forth in claim 9 wherein said moveable contact carrier comprises a moveable contact support, pusher rods and an armature for engaging said coil and core assembly; said armature being attached to said pusher rods at one end thereof; said rods at the other end being convex and detachably engaging said contact support to force said moveable contacts into engagement with said fixed contacts and having a rocking movement in relation to the contact support to permit the armature to seat on said coil and core assembly.

14. An electrical contactor comprising a mounting base for attaching a contactor to mounting means, upper and lower casing members extending laterally to said base to project the contactor outwardly from the mounting means, fixed contacts mounted in said casing members at the opposite end to said base, an electromagnet with a core, coil and movable armature positioned by said casing between said fixed contacts and said base, a contact carrier attached to said armature for encompassing said core and coil, said carrier having movable contacts resiliently mounted with springs in the plane of the carrier and armature pressing the moveable contacts against the fixed contacts on engagement therewith and extending laterally to said base, said casing members having upper and lower guide surfaces arranged around said core and coil to reciprocally support said carrier in aligned relation with said armature and core and coil so that the contactor has a narrow dimension lateral to the movement of the contact carrier.

15. An electrical contactor as set forth in claim 14 wherein means are provided for supporting said fixed contacts, said supporting means being separable from said upper casing member and said lower casing member, and retaining means are provided for holding said members together and said supporting means in place.

16. An electrical contactor as set forth in claim 15 wherein said upper and lower members have partitions extending normal thereto to form an inner chamber for said core and coil assembly and an open space for receiving said supporting means, the partitions of the upper member forming with the partitions of the lower member a lateral opening for said contact carrier to pass from the inner chamber to the outer chamber and for engaging said fixed contacts.

17. An electrical contactor comprising a base panel, first and second contactor component supporting members extending from said panel and having the longitudinal dimension normal to said panel, said first and second members each having spaced parallel side walls, said side walls of the first and second members on a respective side of the contactor being substantially in the same plane, front portions extending between the ends of the side walls opposite to the panel and having fixed contacts, a coil and core assembly, a contact carrier with moveable contacts for engaging the fixed contacts, said side walls and front portions having means for [fixedly] supporting said core and coil assembly and means for slideably supporting said contact carrier within the transverse projection of said walls and front portions to form a compact contactor.

18. An electrical contactor comprising a panel, two flat contactor component supporting members extending normal to the panel, each having a width substantially greater than the depth to form a flat elongated housing, a thin contact carrier extending parallel to the supporting members and having moveable contacts normal to the carrier, means for actuating the carrier on energization and deenergization, each member having a set of fixed contacts in opposing relation and plug means fitting in the end of the members to lock the housing together.

19. An electrical contactor comprising a panel, two flat contactor component supporting members extending normal to the panel each having a width substantially greater than the depth to form a flat elongated housing, a contact carrier extending parallel to the supporting members and having moveable contacts extending normal to the carrier, each member having a set of fixed contacts, each of said fixed contacts having a generally S-shape to align portions of said contact and said moveable contacts to reduce the depth of the members and provide a flat contactor.

20. An electrical contactor comprising two supporting members on opposite sides of a parting plane for housing electrical components, each member having a set of spaced electrical contacts with a set of one member matching the set of the other member on opposite sides of the parting plane to form pairs of spaced contacts, each member having a set of projecting blocks with the blocks of one member matching the blocks of the other member to form pairs of blocks between pairs of electrical contacts, fastening means having facing projections on opposite sides of the parting plane fitting on said members with said projecting blocks therebetween for locking said members together and having on opposite sides of the parting plane sets of contact projections engaging said electrical contacts for holding said contacts in a respective member.

21. An electrical contactor comprising a coil and core assembly, a contact carrier with contacts and armature and actuated by said assembly, two matching contactor component holding members forming an enclosing casing having a narrow dimension lateral to the movement of said carrier and a long dimension longitudinal to the movement of said carrier, each of said holding members having fixed contact holding means facing one another on opposite sides of the plane of movement of said carrier and each of said holding members having a set of fixed contacts fitting in said holding means to form pairs of contacts for engagement by said carrier contacts on actuation, said holding members having means for [firmly] supporting said coil and core assembly and having surfaces extending longitudinally and surfaces extending laterally for linearly guiding said contact carrier on actuation by said coil and core assembly.

References Cited by the Examiner

The following references, cited by the Examiner, are of record in the patented file of this patent or the original patent.

UNITED STATES PATENTS

| | | | |
|---|---|---|---|
| 2,565,467 | 8/1951 | Besag et al. | 335—132 |
| 2,692,314 | 10/1954 | Lawrence | 335—129 |
| 2,724,814 | 11/1955 | Stubbers | 339—198 |
| 2,924,685 | 2/1960 | Burch | 335—132 |

FOREIGN PATENTS

| | | |
|---|---|---|
| 1,059,083 | 6/1959 | Germany. |
| 829,689 | 3/1960 | Great Britain. |

BERNARD A. GILHEANY, *Primary Examiner.*

R. N. ENVALL, *Assistant Examiner.*